UNITED STATES PATENT OFFICE.

FRANKLIN DORR, OF BALTIMORE, MARYLAND.

PROCESS OF TREATING CEREALS.

SPECIFICATION forming part of Letters Patent No. 412,951, dated October 15, 1889.

Application filed July 25, 1889. Serial No. 318,666. (Specimens.)

*To all whom it may concern:*

Be it known that I, FRANKLIN DORR, a citizen of the United States, residing in the city of Baltimore, in the State of Maryland, have invented a new and useful Improvement in the Process of Treating Cereals, of which the following is a specification.

My invention relates to the treatment of cereals—such as barley, wheat, rye, and one of the elementary products of maize, known in commerce as "grits"—for the purpose of adapting them to use in brewing or distilling, and also as a food product.

This invention has for its object the obtainment from the above-mentioned cereals or any combination of the same of such products that will enable them (cereals) to be utilized in a more economic and expeditious manner than heretofore.

I proceed as follows: I select the cereals, or parts thereof, before mentioned in their fully-matured condition. Having obtained the above-mentioned articles in their perfect condition, I commence the treatment by carefully removing all foreign substances, with a greater or less portion of the bran or outside husk, by passing the cereals through any well-known device for cleaning or pearling the same, at the same time separating the clean grain or granules from the chaff, dirt, and husk, &c. Having prepared the cereals as above noted, I pass them through or into the pressure of steam in a suitable vessel. For this purpose the materials are placed, in either a dry or moistened condition, into a process-kettle, and are agitated during the steaming, so as to give each and every grain or part thereof the same amount of heat and moisture. The grains and granules thus treated should be thoroughly cooked, for which purpose they are subjected to a temperature of from 150° to 250° Fahrenheit and a steam-pressure of ten to fifteen pounds. The evolved and prepared constituents should be subjected to a drying or cooling process, being agitated at the same time to enable each grain or granule to be dried equally and alike. The partly-dried cereals or granules are then subjected to the most important and distinctive part of my process, for which purpose they are passed through fast-revolving burr-mills, dressed and grooved, in contradistinction to being passed through rolls. The mill should be heated by friction of the two faces of the stones until the heat obtained should be at least 200° Fahrenheit before the prepared grains or granules are admitted thereto. The heat thus generated is maintained in the operation of grinding and extracts all the remaining moisture, and also continues to completion such chemical changes as are stimulated by heat. I convey the product to any well-known comminuting machine or device and reduce the product to a granular shape (in contradistinction to the stringy or coraline and flaky form) to enable it to be more readily adapted to quick and perfect solution when subsequently applied to the uses for which it is intended.

The above-described product as prepared will keep in any climate, and it is known in the trade as "Barlyne."

The herein-named cereals may be treated by the same process separately; but the result and product will be of less value than when they are used in combination.

For brewing and distilling purposes the percentage of barley, wheat, and rye combined should never exceed twenty-five per cent. of the combination. For food purposes it should be somewhat less.

In defining my invention with greater clearness I would state that I am aware of the various products for brewing and distilling, known as "coralline," "cerealine," "flake cereals," &c., and which are produced by cooking the grains and then rolling them between rolls heated or otherwise. My process is distinctive in the following respect: that in the crushing I do not use artificial heat, but utilize the frictional heat of burr-stones (disk-mills) to complete the chemical conversion, and complete the drying in a very desirable and economic way. It is not possible for rolls to supply this heat by friction, for the reason that they touch only at a single point and become cooled in revolution, so that the heat cannot be maintained. By employing burrs (flat disks) whose faces are always in close proximity I prolong the grinding and frictional action and generate and maintain the necessary heat to carry out the process in an expeditious and economic manner.

Having thus described my invention, what I claim as new is—

The process herein described of preparing cereals, consisting in first cooking the grains, then partially drying and cooling the same, then crushing the grains by a prolonged frictional grinding, and in the same operation drying the product and also stimulating chemical changes by the frictional heat generated by the prolonged grinding, substantially as described.

FRANKLIN DORR.

Witnesses:
W. A. WADE,
F. T. ROUSSELOT,
FELIX R. SULLIVAN.